United States Patent [19]

Watkins

[11] Patent Number: 4,915,374
[45] Date of Patent: Apr. 10, 1990

[54] RECUMBENT EXERCISE CYCLE WITH ARTICULATED PEDALS

[75] Inventor: K. Richard Watkins, San Diego, Calif.

[73] Assignee: MEDmetric Corporation, San Diego, Calif.

[21] Appl. No.: 305,949

[22] Filed: Feb. 2, 1989

[51] Int. Cl.⁴ .................... A63B 21/00; G05G 1/00
[52] U.S. Cl. .................... 272/73; 74/594.1; 74/594.3
[58] Field of Search .......... 272/73, DIG. 4; 74/594.1, 594.3, 594.4, 562.5, 562; D21/191; 128/782

[56] References Cited

U.S. PATENT DOCUMENTS

| | | |
|---|---|---|
| 363,522 | 5/1887 | Knous . |
| 385,717 | 7/1888 | Kibbe . |
| 393,837 | 12/1888 | Kibbe .................... 74/594.1 |
| 558,463 | 4/1896 | Bascom . |
| 631,276 | 8/1899 | Bulova .................... 74/594.3 |
| 634,573 | 10/1899 | Copeland . |
| 1,227,743 | 5/1917 | Burgedorff .................... 74/594.1 |
| 3,081,645 | 3/1963 | Bergfors .................... 272/73 |
| 3,789,696 | 2/1974 | Beam III .................... 74/594 |
| 3,888,136 | 6/1975 | Lapeyre .................... 74/594.1 |
| 3,922,929 | 12/1975 | Marchello .................... 74/562 |
| 4,549,555 | 10/1985 | Fraser et al. .................... 128/782 |
| 4,571,834 | 2/1986 | Fraser et al. .................... 33/1 |
| 4,606,241 | 8/1986 | Fredriksson .................... 74/594 |
| 4,648,287 | 3/1987 | Preskitt .................... 74/594 |
| 4,649,934 | 3/1987 | Fraser et al. .................... 128/782 |

FOREIGN PATENT DOCUMENTS

| | | | |
|---|---|---|---|
| 0002603 | 2/1893 | United Kingdom | 74/594.3 |
| 0012603 | 6/1898 | United Kingdom | 74/594.3 |

OTHER PUBLICATIONS

Modified Bicycle, by R. Ford, p. 182.
Precor 815e Semi-Recumbent Stationary Cycle, by Precor U.S.A.

Primary Examiner—Stephen R. Crow
Attorney, Agent, or Firm—Nydegger & Harshman

[57] ABSTRACT

A recumbent exercise cycle comprises a pair of pedals and a seat which are each individually adjustable relative to a crankshaft that is rotatably mounted on the frame of the exercise cycle. In combination, each pedal is connected by an extension arm to a point on a crank arm for movement of the pedal along a circular path about the point on the crank arm, and the crank arm is connected to the crankshaft for movement of the point along a circular path about the crankshaft.

13 Claims, 2 Drawing Sheets

RECUMBENT EXERCISE CYCLE WITH ARTICULATED PEDALS

FIELD OF THE INVENTION

This invention relates generally to exercise equipment. More specifically, the present invention relates to apparatus which are useful for rehabilitation therapy involving exercise of the legs and lower body. This invention is particularly, but not exclusively, suited for use as an exercise apparatus by patients having extension/flexion impaired legs or impaired hip movement.

BACKGROUND OF THE INVENTION

Rehabilitation therapy following any injury is very important. This is so both in terms of the time required for rehabilitation and the effectiveness of the rehabilitation. Fortunately, it is known that proper exercise of the affected anatomy shortens the time for recovery and improves the effectiveness of the rehabilitation. In specific cases where there has been injury to the ankle, knee or hip, it has been suggested that post operative rehabilitation follow a sequence of activities which includes crutch walking, cycling and running. Each of these activities, however, must be carefully monitored and controlled in order to optimize the effect of the exercise.

When exercise cycles are used in rehabilitation therapy, there are some limitations which need to be appreciated. Namely, with any exercise cycle, the feet are confined, or perhaps even forced, to move along definable paths. Consequently, the leg (which for purposes of the discussion here, includes the hip, the knee and the ankle) will assume different angulations depending on the position of the hip relative to the paths of the feet. To the extent the leg is thereby forced into painful positions, a cycling exercise may be counterproductive.

In order to better appreciate leg geometry during a cycling exercise, it is helpful to understand the notions of extension and flexion. Specifically, extension is the movement of the leg which brings its members, i.e. femur and tibia, into or toward a straight condition. Accordingly, the maximum angle of extension for the leg is the angle between the attainable extension and this straight condition. On the other leg, whereas extension pertains to the straightening of the leg, flexion pertains to the bending of the leg away from the straight condition. Accordingly, the maximum angle of flexion is the angle between the attainable flexion and the straight condition. With any given injury to the knee, the maximum angle of extension, or the maximum angle of flexion, or both, may be limited from what would ordinarily be considered normal. Typically, for normal conditions, the angle at maximum extension is zero degrees (0°) and at maximum flexion is approximately one hundred twenty degrees (120°). Unfortunately, restrictions on this range of movement can result from any one of several conditions.

For example, in order to facilitate recovery following reconstructive surgery of the anterior cruciate ligament (ACL) in the knee joint, the ACL should not be stressed or loaded during the rehabilitation period. Consequently, extension is limited. Specifically, in order to avoid loading the ACL, it is known the leg should not be extended to a point where the extension angle is less than approximately forty-five degrees (45°). As another example, in conditions where there is anterior patellar pain, i.e. the knee cap hurts, it is commonly observed that the angle of flexion cannot exceed approximately ninety degrees (90°) without causing excessive pain. In addition to these specific examples, leg movement may be impaired in numerous ways by injury or by complications following corrective surgery. Furthermore, all knee difficulties, regardless of their nature, can only be aggravated by concurrent ankle or hip impairments.

In any event, the objectives of lower body rehabilitation following injuries include providing cardiovascular exercise, preventing quadriceps atrophy, aiding in maintenance or recovery of thigh girth, and realizing an early return for the patient to the activities of daily living. The present invention recognizes that the ankle, knee and hip can be injured at the same time and must therefore be treated simultaneously in an exercise program. Thus, the present invention also recognizes that in order to properly exercise the leg during rehabilitation therapy, an exercise cycle is needed which can concurrently accommodate limitation to knee or hip motion.

In light of the above, it is an object of the present invention to provide an exercise cycle which has multiple adjustment points to accommodate limited ranges of motion of the hip or knee. Another object of the present invention is to provide an exercise cycle which is able to provide a patient with proper cardiovascular exercise while sparing the patient from painful movements of the knee or hip. Still another object of the present invention is to provide an exercise cycle which can concurrently accommodate limited ranges of motion for both legs. Yet another object of the present invention is to provide an exercise cycle which is simple to operate, relatively easy to manufacture and comparatively cost effective.

SUMMARY OF THE INVENTION

A preferred embodiment of the novel recumbent exercise cycle with articulated pedals includes a frame on which a crankshaft is mounted for rotation. Also mounted on the frame is an adjustable seat which can be selectively positioned relative to the crankshaft. Separate crank arms extend from each end of the crankshaft and are oriented substantially perpendicular to the crankshaft. Separate extension arms, each having a connector pivotally attached to one end of the arm, are coupled by the connector to a respective crank arm at a selected point along the crank arm. With this coupling, the connector defines an offset shaft oriented substantially perpendicular to the crank arm about which the extension arm can rotate. A pedal is then pivotally engaged at a selected location along each extension arm.

With the selective engagement of each pedal along a respective extension arm, and the selective coupling of each extension arm along a respective crank arm, each pedal can be individually adjusted relative to the crankshaft. Additionally, the separate adjustment of the seat relative to the crankshaft allows the exercise cycle to accommodate any particular patient's hip, knee or foot dysfunction for optimal operation and exercise within their limited ranges of motion.

In terms of the general movement permitted by the combination of elements comprising the recumbent exercise cycle of the present invention, each pedal is confined to follow a path of general movement within an envelope which results from the superposition and combination of two circular paths. Specifically, each connector, which is itself pivotally attached to an end of its respective extension arm, is selectively coupled at a point along a respective crank arm for movement of the connector on a circular path around the crankshaft. Likewise, each pedal is selectively engaged at a point along its respective extension arm for movement of the pedal on a circular path around the offset shaft of the connector. Consequently, the result is a separately variable path for each pedal which is determined by the selected adjustments of the particular pedal on the respective extension arm and the selected adjustment of the particular connector on the respective crank arm. Thus, each pedal can individually accommodate a patient's ability to move the associated leg within its own limited range of motion. Further, the adjustments of the pedals can be complemented by adjustment of the seat to properly position the patient for optimal movement of the adjusted pedals.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
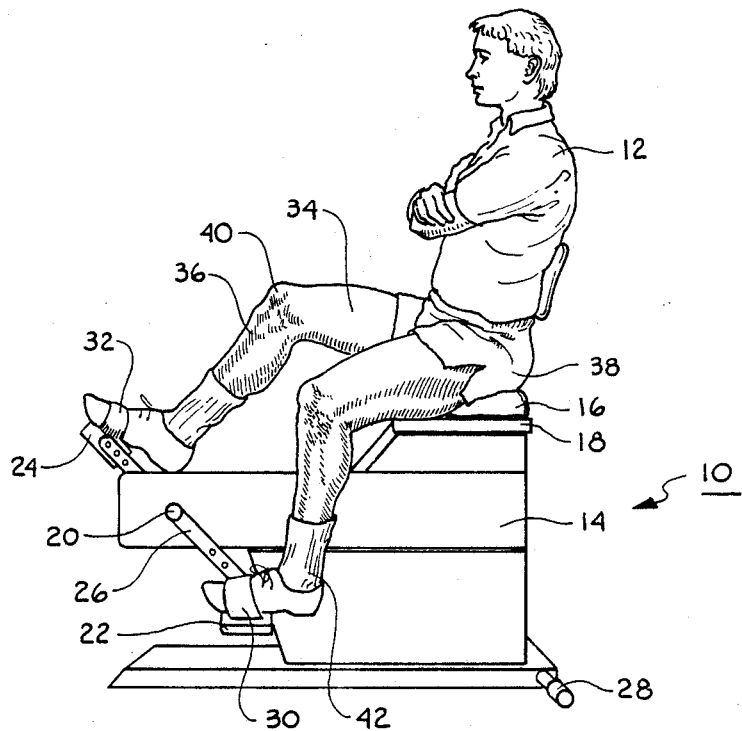
FIG. 1 is a side elevational view of a patient seated on the exercise cycle.

Referring initially to FIG. 1, an exercise cycle is shown and is generally designated 10. A patient 12 is shown seated on exercise cycle 10 in a position suitable for using the cycle 10 in rehabilitation therapy. As shown, exercise cycle 10 comprises a frame 14 on which a seat 16 is adjustably mounted for selective placement along a rail 18. For purposes of the present invention, seat 16 can be positioned along rail 18 and fixedly held in the selected position by any means well known in the pertinent art. For example, seat 16 may be provided with a spring-loaded bolt (not shown) which can be inserted into any of a series of holes (not shown) on rail 18 to hold seat 16 in position on rail 18. A pedal 22 and a pedal 24 are respectively attached to opposite ends of crankshaft 20 by articulation assemblies, of which only articulation assembly 26 can be seen in FIG. 1. A lateral support 28 is attached to frame 14 to provide positional stability for exercise cycle 10 and straps 30 and 32 can be respectively associated with pedals 22 and 24 to hold the feet of patient 12 on the pedals 22 and 24.

Still referring to FIG. 1, it can be seen and appreciated that the range of movement for the left leg of patient 12 which includes thigh (femur) 34 and lower leg (tibia) 36 will depend on the flexibilities of hip 38, knee 40 and ankle 42 of patient 12. The same can be said for the right leg of patient 12. Importantly, when patient 12 is seated on cycle 10 for exercise, the range of permissible motion for the lower extremities of patient 12 will depend collectively on the position of seat 18 relative to crankshaft 20 and the permissible movement of the pedals 22, 24 relative to crankshaft 20.

Figure 2:
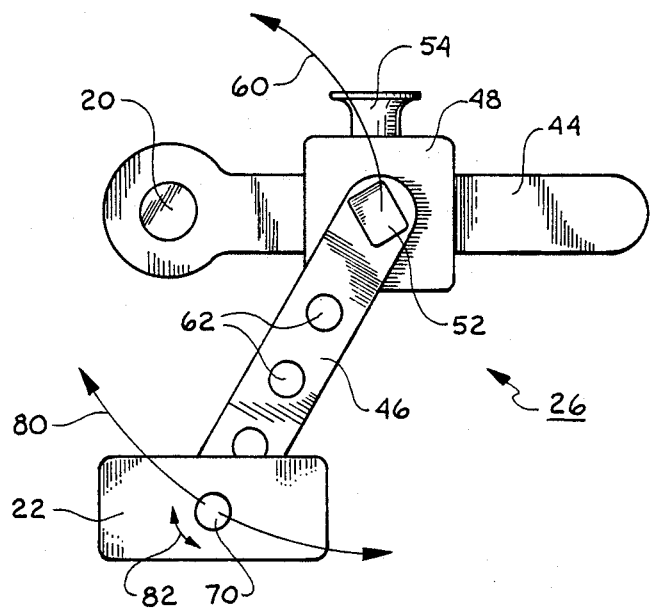
FIG. 2 is a side view of a pedal articulation assembly.
Figure 3:
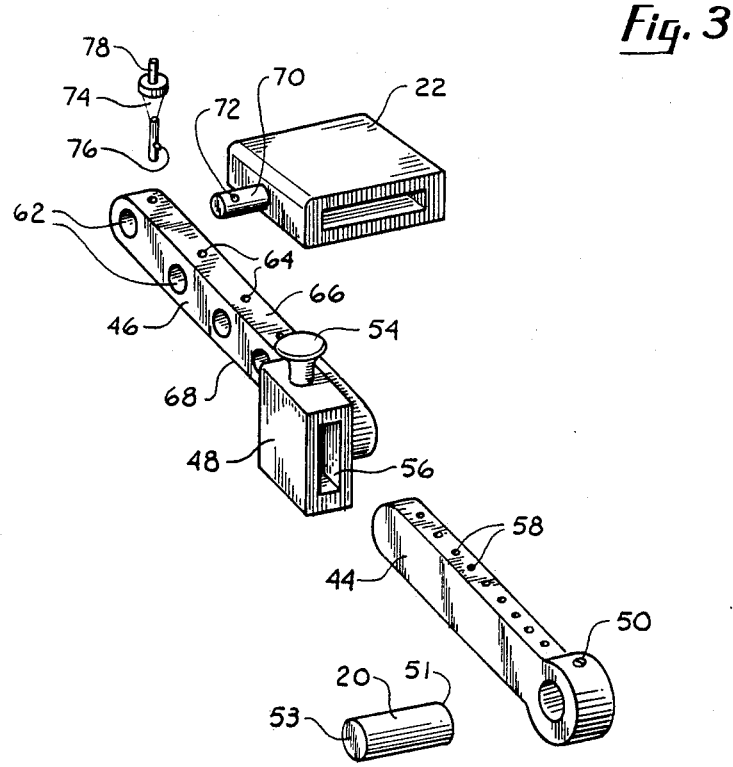
FIG. 3 is an exploded perspective view of a pedal articulation assembly.

Referring now to FIG. 2, it will be seen that articulation assembly 26 generally comprises a crank arm 44 and an extension arm 46. More specifically, crank arm 44 is fixedly attached to crankshaft 20 by any means well known in the art such as by welding or bolting. In FIG. 3, for example, a set screw 50 is shown which can be driven against end 51 of shaft 20 to hold crank arm 44 on shaft 20. It will be appreciated that, in a similar manner, an articulation assembly which is similar in all respects to assembly 26 described herein, is attachable to the end 53 of shaft 20. Specifically, for assembly 26, a connector 48 is pivotally attached to extension arm 46 by a bolt 52 which, as will be better appreciated with further discussion, acts as an offset shaft (subsequently designated by the character 52). As shown in both FIG. 2 and FIG. 3, connector 48 comprises a spring loaded bolt 54 which is urged in a direction which normally extends an end (not shown) of bolt 54 into the opening 56 of connector 48. It is to be appreciated that spring loaded bolt 54 may be manipulated to withdraw the end of bolt 54 from opening 56 to allow insertion of crank arm 44 into the opening 56. Once crank arm 44 is positioned in opening 56 and relative to connector 48, as desired, spring loaded bolt 54 may be released and seated into one of the indentations 58 formed on crank arm 44 to selectively position connector 48 and offset shaft 52 on crank arm 44. Consequently, offset shaft 52 is oriented substantially parallel to the longitudinal axis of crank shaft 20 and is confined to move on a circular path 60 around the crankshaft 20. It will be appreciated that, depending on the point at which connector 48 is attached to crank arm 44, the radius of circular path 60 can be varied.

Referring now to FIG. 3, it will be seen that extension arm 46 is formed with a series of openings 62 spaced along its length. Also, extension arm 46 is formed with a series of holes 64 which extend through extension arm 46 from edge 66 to edge 68. As seen in FIG. 3, pedal 22 comprises a bearing shaft 70 formed with a hole 72. Additionally, FIG. 3 shows a retainer clip 74 which has a spring loaded retractable pin 76 that is normally urged into a configuration wherein it extends outwardly from the clip 74 as shown. A retraction assembly 78, of any type well known in the art, is provided to withdraw pin 76 into clip 74. In combination, bearing shaft 70 is selectively positioned in one of the openings 62 of extension arm 46 with its hole 72 aligned with a respective hole 64. Retainer clip 74 is then inserted into the aligned holes 64, 72 until pin 76 extends against edge 68 to hold pedal 22 in a selected position on extension arm 46.

As best seen in FIG. 2, when pedal 22 is selectively positioned on extension arm 46, pedal 22 is confined to move along a circular path 80 around offset shaft 52. Pedal 22, of course, can be permitted to pivot around its own bearing shaft 70 in the direction of arrow 82 but this pivoting movement does not contribute to the general movement of pedal 22 along a path. Accordingly, the general movement of pedal 22 on exercise cycle 10 is best described relative to crankshaft 20 as the sum of circular movements along the paths 60 and 80.

Figure 4:
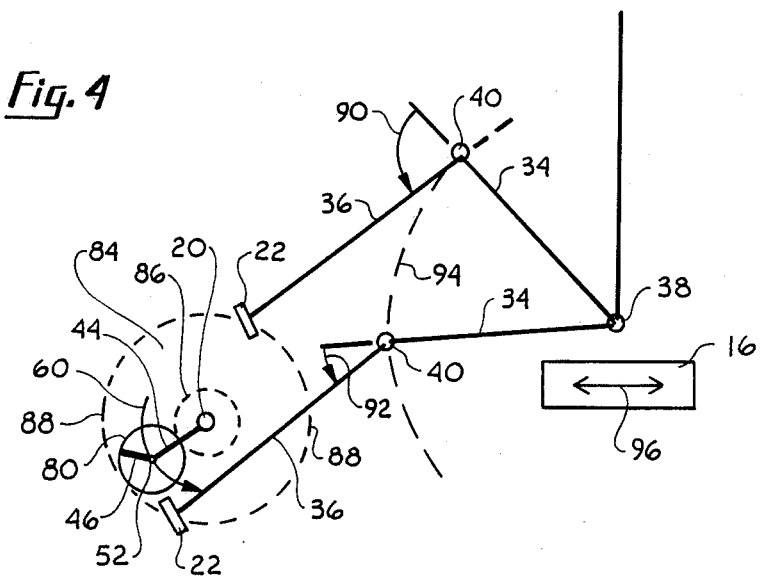
FIG. 4 is a schematic drawing of the geometry of cooperation between the leg of the patient and the permissible travel of a pedal of the exercise cycle.

The general motion of pedal 22 is accurately described as an epicycloid and is perhaps best seen with reference to FIG. 4 where it will be appreciated that, without an extension arm 46, pedal 22 could move only on a circular path 60 around crankshaft 20. With extension arm 46, however, pedal 22 is able to move on a circular path 80 around offset shaft 52 in addition to its movement on path 60. The result is a possibility for pedal 22 to move along an infinite variety of paths within an envelope 84 circumscribed by a minimum arc 86 and a maximum arc 88. Consequently, with pedal movement confined for movement within envelope 84, the flexion angle 90 and extension angle 92 can be controlled over desired ranges of motion to conform movement of pedal 22 with the physical limitations of the patient. For example, FIG. 4 represents knee 40 in a position with lower leg 36 extended. FIG. 4 also shows that, as knee 40 is moved along the path 94 into the position of knee 40', the thigh 34' and the lower leg 36' are moved from an extended position defined by extension angle 92 into a flexed position defined by flexion angle 90. With articulation assembly 26 of exercise cycle 10 the range of this change in angle can be controlled. Specifically, pedal 22 need not necessarily move along arc 88 from its start position into the position of pedal 22'. Instead, pedal 22 may follow any arbitrary path within the envelope 84 between these positions. Furthermore, the positions shown for pedal 22 and pedal 22' are themselves also arbitrary. Thus, there is much leeway and flexibility afforded by exercise cycle 10 for movement of pedal 22. Importantly, with an established envelope 84, the magnitudes of angles 90 and 92 will also depend on the position of seat 16 relative to crankshaft 20. Accordingly, in a manner described above, seat 16 may be moved forward or aft as indicated by arrow 96 to adjust the seat 16 for optimal exercise.

In sum, patient leg movement in conformance with the physical limitations imposed by injury or impairment is realized with exercise cycle 10 by providing for separate adjustments to pedals 22, 24 and seat 16. Additional flexibility is made possible by adjustments to each of the pedals 22, 24 which free the pedals 22, 24 from movement on confined circular paths and instead permit them to move with a variably defined envelope 84.

While the particular exercise cycle as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as defined in the appended claims.

I claim:

1. A recumbent exercise cycle which comprises:
   a frame;
   a rotatable crankshaft mounted on said frame, said crankshaft having a first end and a second end;
   a first crank arm and a second crank arm, each fixedly attached to said respective first and second ends of said crankshaft;
   a first pedal and a second pedal;
   a first offset shaft and a second offset shaft oriented substantially parallel to said crankshaft and respectively coupled thereto by said first and second crank arms for the rotation of said offset shafts about said crankshaft;
   a first extension arm and a second extension arm extending from said first and second offset shafts, respectively, and attached to said first and second pedals, respectively, for rotation of said pedals about said offset shafts; and
   means associated with said shafts to selectively position said offset shafts at points along said crank arms.

2. A recumbent exercise cycle as recited in claim 1 further comprising a seat support adjustably mounted on said frame to position said seat support relative to said crankshaft within a plane substantially perpendicular to the longitudinal axis of said crankshaft.

3. A recumbent exercise cycle as recited in claim 1 further comprising means associated with each of said pedals to selectively position said pedal at points along said extension arm.

4. A recumbent exercise cycle as recited in claim 1 wherein said pedals are rotatably attached to said extension arms.

5. A recumbent exercise cycle as recited in claim 1 wherein said crank arms are oriented substantially perpendicular to said crankshaft.

6. A recumbent exercise cycle which comprises:
   a frame;
   a rotatable crankshaft mounted on said frame, said crankshaft having a first end and a second end;
   a first pedal and a second pedal;
   a first crank arm and a second crank arm each fixedly attached to said respective first and second ends of said crankshaft substantially perpendicular thereto; and
   a first extension arm and a second extension arm, each having an offset shaft with means for joining to said respective crank arms at selected points thereon, and said pedals being attached to said respective extension arm for movement of said pedals in a circular path about the selected point on said respective crank arms.

7. A recumbent exercise cycle as recited in claim 6 further comprising a seat support adjustably mounted on said frame to position said seat support relative to said crankshaft within a plane substantially perpendicular to the longitudinal axis of said crankshaft.

8. A recumbent exercise cycle as recited in claim 7 wherein said pedals are rotatably attached to said extension arms.

9. An exercise apparatus for rehabilitation of the lower body which comprises:
   a frame;
   a crankshaft mounted on said frame;
   a first pedal and a second pedal;
   a first offset shaft and a second offset shaft, said first and second offset shafts being oriented substantially parallel to said crankshaft;
   a first crank arm and a second crank arm for coupling said offset shafts to respective first and second ends of said crankshaft;
   a first extension arm and a second extension arm for respectively moving said first and second pedals in circular paths around said first and second offset shafts; and
   an adjustable connecting means for selectively positioning said offset shafts along said crank arms.

10. An exercise apparatus as recited in claim 9 further comprising an adjustable connecting means for selectively positioning said pedal along said extension arm.

11. An exercise apparatus as recited in claim 9 further comprising a seat support adjustably mounted on said frame to position said seat support relative to said crankshaft within a plane substantially perpendicular to the longitudinal axis of said crankshaft.

12. An exercise apparatus as recited in claim 9 wherein said pedals are rotatably attached to said extension arms.

13. An exercise apparatus as recited in claim 9 wherein each of said crank arms is oriented substantially perpendicular to said crankshaft.

* * * * *